3,555,399
COMMUTATION SYSTEMS INCORPORATING THE ENERGY LOGIC CONCEPT
James L. Buchanan, McKean, and William B. Zelina, Erie, Pa., assignors to General Systems Inc., a corporation of Pennsylvania
Filed Nov. 16, 1967, Ser. No. 690,692
Int. Cl. H02m 7/44
U.S. Cl. 321—43                    35 Claims

ABSTRACT OF THE DISCLOSURE

A commutation system for turning off an electric valve which when conducting supplies energizing current to an electrical load means from a direct current source wherein an electrical energy storage means is connected to be charged when the electric valve is nonconducting and the energy thereof is sensed by an energy sensing means connected to prevent the application of electrical turn on signals to the electrical valve unless a predetermined amount of energy is stored in such energy storage means. At a desired time after the initiation of conduction in the electric valve, and preferably a fixed time thereafter, the energy of the energy storage means is utilized to reverse bias the electric valve.

---

This invention relates generally to commutation systems for turning off an electric valve of the gate controlled type which when conducting supplies energizing current to an electrical load means from a direct current source. The present invention employs the energy logic concept disclosed and claimed in U.S. Pat. No. 3,355,656 which patent is assigned to the assignee of this invention.

Since in gate controlled electric valves, such as thyristors, the gate electrode has no control once the anode to cathode current is flowing, some external means must be employed to turn off or stop the current flow in such valve. As is well known, there are two basic methods available to effect the required commutation, namely, current interruption in the anode-cathode circuit and forced commutation. The commutation system of this invention uses the latter technique wherein energy of an energy storage means is employed to reverse bias the electric valve. For example, to assure rapid turn off, current may be switched from the energy storage source so as to force more current through the electric valve in the reverse direction that is trying to flow in the forward direction.

The prior art is replete with commutation circuit arrangements attempting to provide reliable and completely foolproof commutation. These many circuit approaches have varied in complexity and, while such arrangements have often been moderately successful in minimizing the occurances of failures in turning off the electric valve, it was not until the discovery of the energy logic concept, which is disclosed and claimed in U.S. Pat. No. 3,355,656 that a universal solution was provided for guaranteeing against failures to turn off the electric valve under any and all conditions of load and/or source voltage transients. For example, the energy logic concept guarantees that more than sufficient energy will be available in the energy sorage means to turn off the electric valve before any attempt can be made to use such stored energy for that purpose.

The importance and fundamental nature of the energy logic concept for use in commutation systems for turning off electric valves disclosed and claimed in the foregoing U.S. Pat. No. 3,355,656 makes it desirable that further development be undertaken to provide commutation systems utilizing this concept in the best manner for the particular load and/or source requirements.

It is an object of this invention, therefore, to provide a commutation system incorporating the foregoing energy logic concept in a new and novel manner.

It is another object of the invention to provide a commutation system incorporating the energy logic concept in a manner which is especially useful for those applications wherein the load circuit supplied from the electric valve includes one or more magnetic components which must not be allowed to saturate.

Briefly stated, in accordance with one aspect of this invention, there is provided a commutation system for turning off an electric valve of the type having anode-cathode and control electrodes, which electric valve is arranged when conducting to supply energizing current to an electrical load means from a direct current source. The commutation system includes an energy sensing means, such as a breakover device, connected to sense the energy of the energy storage means of the commutation system and to prevent the application of electrical turn on signals to turn on the electric valve unless a predetermined amount of energy is stored in the energy storage means. The system also includes means operative to utilize the previously stored and sensed energy of the energy storage means to reverse bias the electric valve. Since the predetermined amount of energy so sensed is made to be more than required to assure turn off of the electric valve, once the electric valve has been allowed to be turned on there is a guarantee that when required to be used there will be sufficient energy available to assure turn off. That is, if for any reason the level of stored energy is less than the amount necessary to assure turn off the electric valve would not have been allowed to have been turned on in the first place. Once the electric valve has been turned on, the commutating energy is locked in the commutation system and disturbances of any kind in the external circuit, such as for example transients in the load or source, can have no effect on the amount of energy available for turn off.

The novel features believed characteristic of the invention are set forth with particularity in the appended claims. The invention itself however both as to its organization and mode of operation together with further objects and advantages thereof may best be understood by reference to the following description taken in conjunction with the accompanying drawings in which:

Because any gate-controlled electric valve requires an external means to provide turn off, the commutation system of this invention has application to a wide variety of electrical circuit glasses. For convenience and simplicity of description, however, the invention will be described in detail herein in connection with the class of circuits known in the art as "choppers." Such chopper circuits may be defined as single-ended inverters for transforming D.C. to D.C. or D.C. to A.C.

Figure 1:
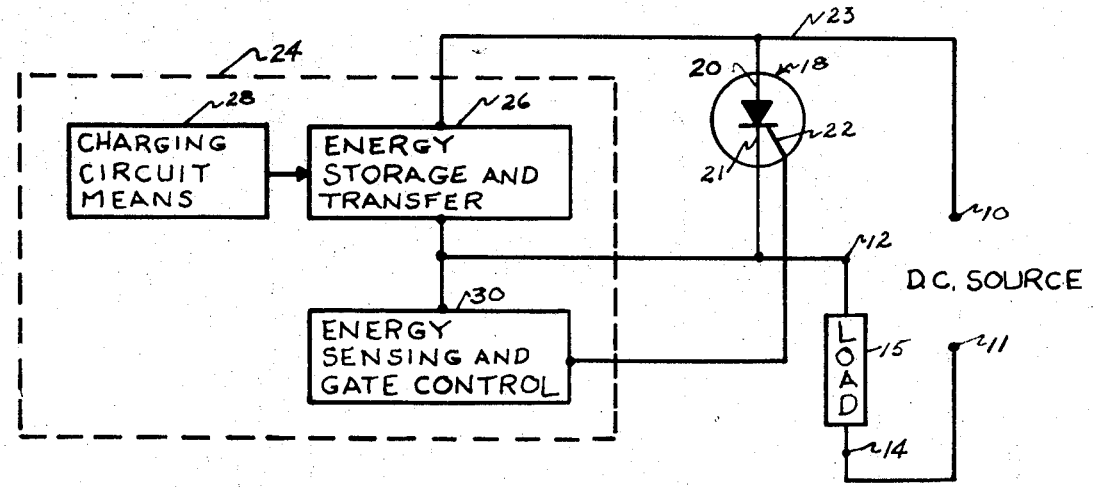
FIG. 1 is a partial schematic circuit diagram of a circuit arrangement incorporating this invention.

FIG. 1 shows a partial schematic circuit diagram illustrating the general organization of the commutation system of the present invention and its use with a gate-controlled electric valve so as to effect the desired control thereof. As shown, the arrangement is provided with input terminals 10 and 11, which are adapted to be connected to a direct current source, and output terminals 12 and 14, adapted to be connected to a load means such as 15. A first electric valve 18 has anode, cathode and control electrodes 20, 21, and 22 respectively. The anode electrode 20 is connected over conductor 23 with the direct current source while the cathode electrode 21 thereof is connected to the output terminal 12. The other output terminal 14 is adapted to be connected with the direct current source through the terminal 11. Accordingly, the electric valve 18, when rendered conductive by the application to control electrode 22 of suitable electrical turn on signals, supplies energizing current from the direct current source to the electrical load means 15 connected to the output terminals 12 and 14.

A commutation system, generally designated as 24 is provided for the electric valve 18 so that the power supplied to the load may be controlled. As shown commutation system 24 includes an energy storage and transfer means 26 and a charging circuit means 28 to charge the energy storage means of energy storage and transfer means 26 when the electric valve 18 is nonconducting. An energy sensing and gate signal control means 30 is operatively connected with the energy storage and transfer means 26 so as to sense the energy level of the energy storage means thereof and prevent the application of electrical turn on signals to the control electrode 22 of electric valve 18 unless a predetermined amount of energy is stored in the energy storage means. This may be provided in any suitable manner, such as for example, by disabling a source of electrical turn on signals unless the predetermined amount of energy has been sensed, by controlling a switch means connected between the energy sensing means and the control electrode 22 or in any other suitable manner which will assure that no turn on signals appear at the control electrode 22 of the electric valve 18 unless the required amount of energy has first been stored. For simplicity, therefore, the energy sensing and gate signal control means has been illustrated in diagrammatic fashion as simply connected between the energy store and transfer means 26 and the control electrode 22. The energy stored in th energy storage means of energy storage and transfer means 26, which energy has been previously sensed so that the amount thereof was known to be adequate, is then utilized in a suitable manner to reverse bias electric valve 18. Conveniently, an auxiliary electric valve may be employed and the charge on the energy storage means of the energy storage and transfer means 26 allowed to be reversed so that turn on of the auxiliary electric valve at any desired time thereafter makes the energy of the energy storage means available to provide the necessary reverse bias to turn off the electric valve 18. For example, the auxiliary electric valve may be connected with the energy storage means, such as a capacitance, so that when turned on the energy storage means will be connected across the anode-cathode electrodes of electric valve 18. In operation, when the D.C. source is connected to the input terminals 10 and 11, the energy storage means of energy storage and transfer means 26 is charged through the load means 15 connected across the output terminals 12 and 14. Only when the energy sensing means 30 senses a predetermined amount of energy in the energy storage means of energy storage and transfer means 26 are electrical turn on signals allowed to be applied to the control electrode 22 to initiate conduction in electrical valve 18. When electric valve 18 is rendered conducting, current flows from the direct current source in two paths; load current flows through load means 15 connected between the output terminals 12 and 14 and commutating current flows through energy storage and transfer means 26 and the anode-cathode electrodes of electric valve 18 so that the charge originally on the energy storage means of energy storage and transfer means 26 is reversed. When the auxiliary electric valve is turned on, the energy storage means is effectively connected in the reverse bias direction across electric valve 18 causing it to be turned off.

Figure 2:
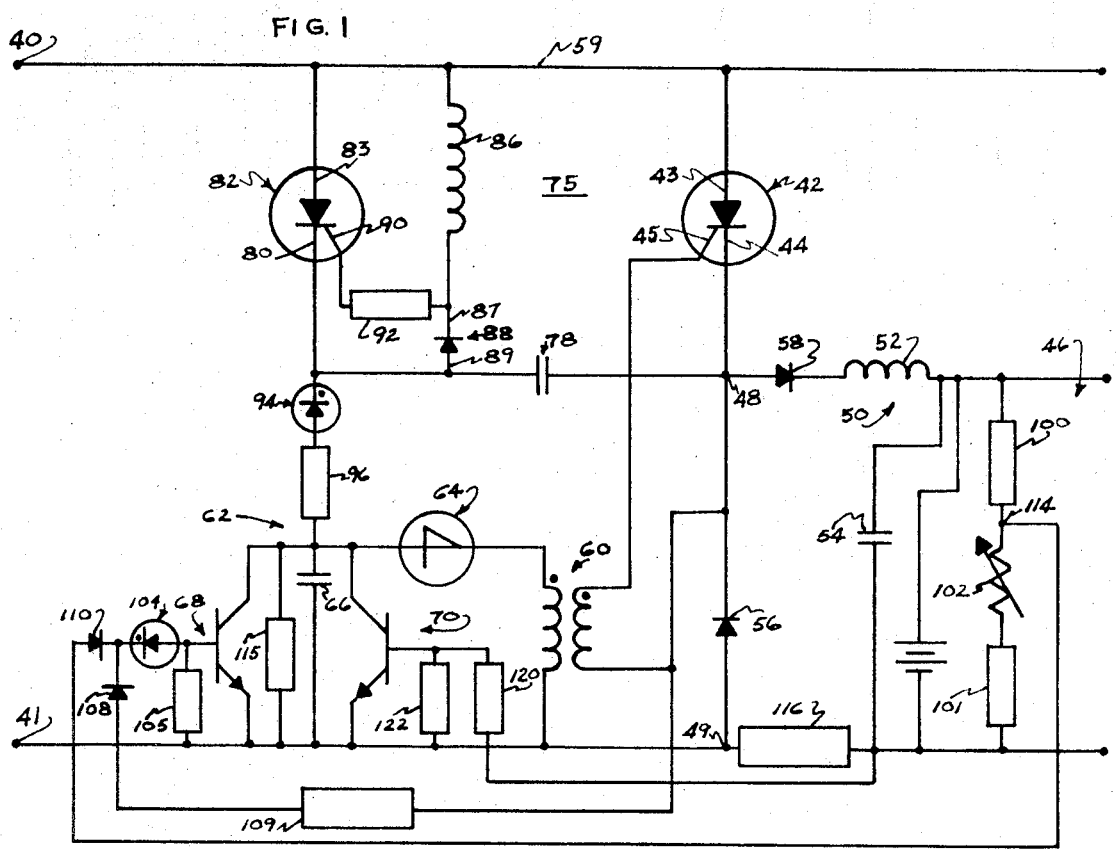
FIG. 2 is a schematic circuit diagram of a chopper regulator circuit arrangement incorporating the commutation system of this invention.

In FIG. 2 there is shown a schematic circuit diagram of a chopper regulator circuit arrangement incorporating the commutation system of this invention. As shown, input terminals 40 and 41 are adapted to be connected with a direct current source and an electric valve 42, which may be a controlled rectifier having an anode electrode 43, a cathode electrode 44 and a control electrode 45, is connected to supply energizing current to an electrical load means 46 adapted to be connected with the output terminals 48 and 49. Load means 46 is shown connected with output terminals 48 and 49 through a filter circuit means 50 including a reactor 52 and a capacitance 54. Because of the inductive nature of reactor 52 "free wheeling" diode 56 is provided and connected across the output terminals 48 and 49. A diode rectifier 58 is connected in series with the reactor 52.

The control electrode 45 of controlled rectifier 42 is coupled through a suitable pulse transformer 60 to a source of electrical turn on signals, shown as an oscillator circuit 62. Oscillator circuit 62 includes a suitable unilateral switch means, shown as a Shockley-type diode 64, and a capacitance 66. The oscillator circuit 62 is also provided with first and second transistor devices, 68 and 70 respectively, which shunt the capacitance 66. The amount of current shunted by the transistor devices 68 and 70, which are controlled respectively by load voltage and current feed-back signals, determines the repetition rate of the turn on signals applied through the pulse transformer 60 to the control electrode 45. In the absence of a feedback signal at their respective base electrodes, transistor devices 68 and 70 are non-conducting. That is, transistors 68 and 70 are normally off and their conductivity is controlled by the feed-back signals.

In accordance with this invention the turn on and turn off of the electric valve 42 are controlled by the commutation system 75. The commutation system 75 includes an energy storage means, shown as a capacitance 78, connected between the cathode 45 of controlled rectifier 42 and the cathode 80 of a second, or auxiliary, electric valve 82 the anode electrode 83 of which is connected to the direct current source over conductor 59. The energy storage means 78 is thus charged in a first sense through the electric valve 82 when the first electric valve 42 is non-conducting.

An inductance 86 is connected in series circuit relationship with the energy storage means 78 and the anode and cathode electrodes of the controlled rectifier 42 to establish a transfer circuit operative to allow the charge of the energy storage means 78 to be reversed while being locked within the transfer circuit made up by the series loop of inductance 86, energy storage means 78 and the anode electrode 43 and cathode electrode 44 of electric valve 42. Conveniently, for reasons to become evident later, a diode rectifier 88 may be connected in series between the inductance 86 and the energy storage means 78. The control electrode 90 of the second electric valve 82 is connected through a suitable resistance 92 to the junction between inductance 86 and the cathode 87 of diode rectifier 88 the anode 89 of which is connected with energy storage means 78. Diode rectifier 88 performs two functions, namely, allows the voltage developed across inductance 86 to cause turn on of second electric valve 82 for charging energy storage means 78 when the controlled rectifier 42 is non-conducting, and detecting when the charge on the energy storage means 78 has been reversed to again cause turn on of the second electric valve 82 and allow the energy of the energy storage means 78 to reverse bias controlled rectifier 42.

The commutation system also includes an energy sensing means 94 to sense the energy of the energy storage means. Energy sensing means 94 may be any suitable threshold sensing device preferably, energy sensing means 94 is a semiconductor breakover device, such as a Zener-type diode. As shown, therefore, a breakover device 94 is connected through a suitable resistance 96 between the energy storage means 78 and the oscillator circuit 62. The breakover device 94 is thus connected to sense the energy of the energy storage means and prevent operation of the oscillator circuit 62 unless sufficient energy is stored in the energy storage means 78 to cause breakover of the device 94. That is, there must be a predetermined level of energy in the energy storage means 78 before the oscillator circuit 62 can begin to generate electrical turn on signals for application to the collector electrode 45 of controlled rectifier 42. Stated simply, the energy sensing means functions to prevent turn on of the controlled rectifier 42 unless there is a predetermined level of energy available in the energy storage means; this predetermined level being conveniently provided to make available more than sufficient energy to assure turn off when such energy is later employed to reverse bias the electric valve 42.

A voltage control circuit is also provided to develop voltage feed-back signals representing the deviation in output voltage from a desired valve. The voltage control circuit includes a voltage divider including fixed resistances 100 and 101 and a variable resistance 102 connected in series combination across the filter circuit means 50. The fixed resistances 100 and 101 determine the maximum and minimum valves of load voltage while the variable resistance 102 allows for compensation of component valves. The voltage control circuit also includes a voltage reference means, shown as provided by a semiconductor breakover device 104 and the base-to-emitter barrier voltage of the transistor device 68. For example, one terminal of breakover device 104 is connected to the base electrode of transistor 68 and through a suitable resistance 105 to the common conductor 61 to which the emitter electrode is also connected. The other terminal of breakover device 104 is connected through a diode rectifier 108 and a resistance 109 to the output terminal 48 and also through a diode rectifier 110 to the junction 114 between the fixed resistance 100 and variable resistance 102. A resistance 115 is connected across capacitance 66 to provide a leakage path for energy sensing breakover device 94 to assure further reliability.

A current measuring circuit is also provided which develops current feed-back signals. This circuit includes a current measuring shunt 116 connected in series between terminal 49 and the load. The current feed-back signals are coupled from the current measuring shunt 116 through a suitable resistance 120 to the base electrode of transistor device 70; the base electrode being also connected to common conductor 61 through a suitable resistance 122.

In operation, when terminals 40 and 41 are connected to the direct current source the voltage developed across inductance 86 turns on the electric valve 82 and allows the energy storage means 78 to charge from the source, through the anode and cathode electrodes of the electric valve 42, the output terminal 48, load means 46 and back to the source. At such time as the energy in the energy storage means 78 reaches a level sufficient to cause breakover device 94 to breakover, indicating a predetermined energy level in the energy storage means, capacitor 66 in oscillator circuit 62 begins to charge up until the voltage thereof is sufficient to breakdown the Schockley-type diode 64. When this occurs, an electrical turn on signal is applied through pulse transformer 60 to the control electrode 45 to render electric valve 42 conducting. When electric valve 42 is conducting current flows in two paths; (1) load current flows through load means 46 and (2) commutating current flows through energy storage means 78, inductance 86 and the anode and cathode electrodes of electric valve 42. This series loop made up of the energy storage means 78, inductance 86 and the electric valve 42 provides a transfer circuit which allows the charge on the energy storage means 78 to be reversed while at the same time locking the energy, previously sensed by the energy storage means, within the loop. Because of this lock-in characteristic, once the electric valve 42 is conducting, supply or load transients can have no effect whatever on the amount of energy available to commutate the electric valve.

When the energy storage means 78 is a capacitance, inductance 86 forms a series resonant circuit therewith. This series resonant circuit provides a simple and convenient means for transfering energy from the capacitance so as to allow the charge on the capacitance 78 to be reversed and thus available to provide a reverse bias for electric valve 42 when connected thereacross by turning on the second electric valve 82.

In order to utilize the maximum amount of stored energy in reverse biasing electric valve 42, the second electric valve 82 is preferably a gate-controlled device, such as a thyristor, connected to be rendered conductive when all of the energy has been transfered and re-stored in the opposite sense in the energy storage means 78. This may be conveniently accomplished when energy storage means 78 is a capacitance, by connecting a diode rectifier 88 between the inductance 86 and the capacitance. Diode 88 will conduct commutating current from capacitance 78 for one half-cycle of the resonant frequency of the series resonant circuit made up of inductance 86 and capacitance 78. When the current reverses on the other half-cycle, indicating that the charge on the capacitance has been reversed (i.e. all the energy has been transferred) current flow is blocked by diode rectifier 88 and a turn on signal is applied to the control electrode 90 of the second electric valve 82. When the second electric valve 82 is turned on, the energy storage means 78 is connected across the first electric valve 42 and the energy thereof effects the turn off of electric valve 42.

In the arrangement illustrated in FIG. 2, employing a series inductance—capacitance resonant circuit, the first electric valve 42 will remain conducting for only a fixed time after initiation of conduction, which time is determined by the natural frequency of the series resonant inductance—capacitance combination. This mode of operation is often desirable and sometimes required as, for example, where the load means includes reactive components which must not reach saturation during operation. This is so, for example, in the arrangement of FIG. 2 wherein the volt-seconds applied to the filter circuit means must be controlled so that reactor 52 does not saturate during operation.

In the foregoing described arrangement, therefore, pulses of source voltage are supplied through the first electric valve 42 and through the output filter circuit 50 to the load means 46 at a rate determined by the load demand. As load increases, the repetition rate of the turn on pulses increases. The filter circuit means 50 converts the "short-time" pulses to smooth direct current at the load. Both the voltage control system and current measuring system provide feed-back signals to the gate signal source to control its operation. Accordingly, once sufficient energy is known to be available in the energy storage means, to assure the turn off of the first electric valve 42, then, and only then, will electrical turn-on signals be applied to turn such valve on. For the arrangement illustrated in FIG. 2 this is provided by sensing the energy of the energy storage means with the breakover device 94 and operating to maintain the source of electrical turn-on signals inoperative unless the predetermined amount of energy is available.

Figure 3:
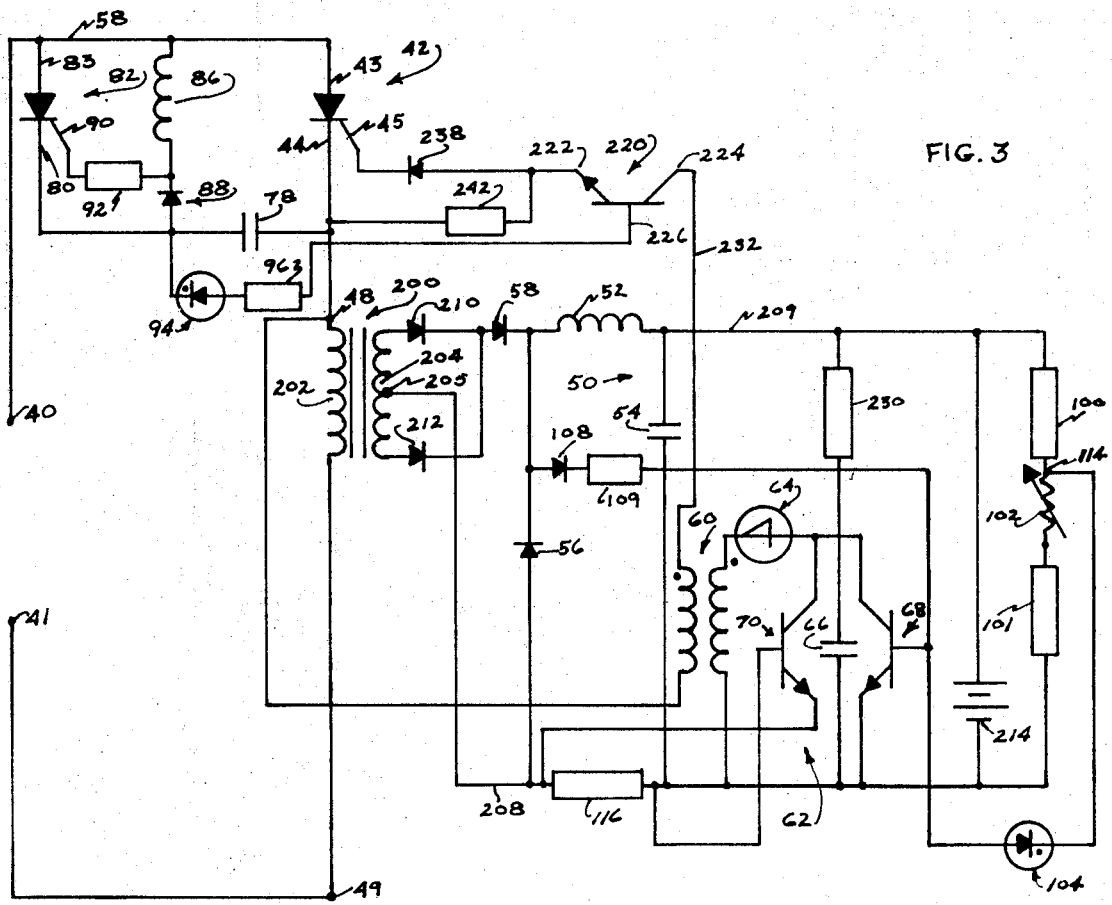
FIG. 3 is a schematic diagram illustrating application of the commutation system of this invention in a chopper regulator circuit having an isolated output; and, FIG. 4 is a partial schematic diagram of a chopper regulator illustrating another embodiment of this invention.

In FIG. 3 there is shown a schematic circuit diagram illustrating an arrangement for incorporating the commutation system of this invention in a regulated isolated output chopper circuit. Since in general the chopper regulator shown in FIG. 3 is similar in organization and mode of operation to that of the chopper regulator shown in FIG. 2, like components thereof will be identified by the same reference numerals.

Accordingly, as shown in FIG. 3, the regulated isolated output chopper circuit has input terminals 40 and 41 adapted to be connected with a direct current source and an electrical load means, generally designated at 46, is adapted to be connected with the output terminals 48 and 49. Load isolation is provided by a suitable transformer 200 the primary winding 202 of which is connected with the output terminals 48 and 49 with the remainder of the load means being coupled thereto by secondary winding 204. The secondary winding 204 has a center tap 205 which is connected to a common conductor 208. The voltage appearing at secondary winding 204 is suitably rectified by rectifier devices 210 and 212 and coupled through blocking diode rectifier 58 to filter circuit means 50, the electrical turn on signal source (oscillator 62) and other elements making up the load means, such as for example a battery 214 if the chopper is used in a battery charger application.

Since in the arrangement of FIG. 3 the output is to be isolated from the direct current source, the source of electrical turn on signals (oscillator 62) is included as part of load means 46 and supplied energizing power over conductors 208 and 209. Also, in order to maintain the desired isolation the electrical turn on signals are coupled from the oscillator 62 to control electrode 45 by the pulse transformer 60.

Since the organization of the oscillator 62 itself as well as that of the voltage and current control circuits operatively associated therewith are the same as that already described in connection with the chopper regulator shown in FIG. 2, such organization and the operation of such circuits need not be repeated here.

In the arrangement of FIG. 3, however, a transistor device 220 having emitter electrode 222, collector electrode 224 and base electrode 226 is connected in series between the pulse transformer 60 and gate electrode and operates to block the application of electrical turn on signals from oscillator 62 to control electrode 45 unless device 94—the energy sensing means—has broken over indicating that there is a predetermined level of energy stored in energy storage means 78. To this end, the emitter electrode 222 is connected through a blocking diode 238 to control electrode 45 and also through a suitable resistance 242 to the cathode electrode 44; collector electrode 224 of the transistor device 220 being connected over conductor 232 to the oscillator circuit through pulse transformer 60. Base electrode 226 is connected to conductor 59 and the direct current source through resistance 96, breakover device 94, diode rectifier 88 and inductance 86. Accordingly, transistor device 220 is nonconducting unless device 94 is broken over. Thus, as shown, energy sensing means 94, which may be a Zener-type breakover device, is connected with the energy storage means 78 to sense the energy level thereof and maintain transistor device 220 in its off condition unless the energy level of energy storage means 78 is sufficient to cause breakover of breakover device 94. As long as transistor device 220 remains nonconducting no electrical turn on signals can be applied from oscillator circuit 62 to the control electrode 45 of electric valve 42 to render the electric valve 42 conducting. Accordingly, in this embodiment of the invention the energy sensing means 94 is operative to prevent the application of electrical turn on signals to electric valve 42 by controlling the operation of a switching means— transistor device 220—connected to prevent coupling of the turn on signals to the electric valve unless device 94 is broken over indicating that there is a predetermined level of energy in energy storage means 78.

In operation, assume initially that the terminals 40 and 41 have just been connected to the direct current source and that transformer 200 is connected as shown to the output terminals 48 and 49. Under this condition the voltage developed across inductance 86 causes second electric valve 82 to be turned on to begin to charge energy storage means 78 in a first sense. That is, from the direct current source and through electric valve 82 and primary winding 202 of transformer 200 so that the terminal of the energy storage means connected with the cathode electrode 80 becomes positive and the terminal connected with the cathode electrode 44 of electric valve 42 becomes negative. At this time electrical turn on signals generated by oscillator circuit 62 are blocked by transistor device 220.

Once the energy sensed by breakover device 94 reaches the predetermined level, however, device 94 breakover causing transistor device 220 to switch on and allow the electrical turn on signals from oscillator 62 to be applied to control electrode 45 of electric valve 42. The operation of the commutation system is the same as that already described in connection with FIG. 2 as is also the general operation of the chopper regulator itself.

In still another embodiment of the invention the electrical turn on signals may be prevented from being applied to control electrode 45 of electric valve 42 by one of the transistors 68 or 70 associated with oscillator 62 saturated to shunt charging current away from capacitance 66 unless sufficient energy has been stored in energy storage means 78 to cause the energy sensing device 94 to breakover. This is shown in detail in FIG. 4 wherein transistor device 68 of oscillator circuit 62 is caused to be saturated by the base drive applied thereto from the output over conductor 240 and through resistance 242 and blocking diode 244. This base drive is removed to allow transistor device to turn off when the transistor device 248 is turned on. Transistor device 248 has its collector electrode 249 connected to the junction between resistance 242 and diode 244 and its emitter electrode 250 connected to the common negative conductor so that in the absense of a signal applied to its base electrode 252 the transistor device 248 is nonconducting. When energy sensing device 94 breaksover, however, indicating that there is a predetermined level of energy in energy storage means 78, base drive is applied to transistor device 248 causing it to switch on which in turn removes the signal which was keeping transistor device 68 saturated so that oscillator circuit 62 can generate turn on signals for application to control electrode 45 of electric valve 42.

Accordingly, any of various different means may be employed to prevent the application of electrical turn on signals to the control electrode 45 of electric valve 42 unless the energy of energy storage means 78 is at or above the predetermined level, which predetermined level may be provided more than sufficient to assure turn off of electric valve 42 under any condition. The electrical signals may be prevented from being applied to the control electrode unless the predetermined level of energy is sensed in any of a number of suitable means.

For example, as illustrated in the particular arrangement of FIG. 2, operation of the means for generating the turn on signals (oscillator 62) may be made directly dependent upon sensing the predetermined energy level in energy storage means 78. That is, unless the predetermined energy level is sensed the turn on signal source is inoperative. Alternatively, the turn on signals may be prevented from being applied to the control electrode of the electric valve 42 by the use of a suitable switch means, such as a transistor device, connected between the source of the electrical turn on signals and the control electrode 45. FIG. 3 illustrates one arrangement of such a switch means connected in series circuit between the source of the turn on signals and the control electrode 45; the switch means (transistor 220) being in an open condition or state unless the predetermined energy level is sensed by the energy sensing means 94.

In another embodiment the turn on signals may be bypassed from the control electrode 45 by a normally on switch means which may be arranged to be turned off by a second switch means being turned on and which second switch means arranged to be turned on only when the predetermined energy level is sensed.

Figure 4:
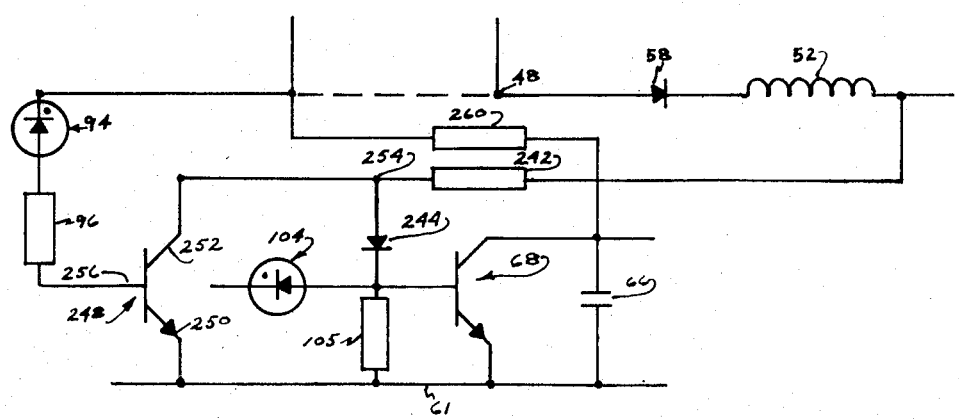

In still another embodiment a signal may be suitably coupled from the output to provide a base drive for one of the transistor devices 68 or 70 operatively associated with the oscillator 62; the base drive signal being selected to drive the transistor device to saturation and thereby prevent the generation of electrical turn on signals. A switch means, such as a transistor, may then be connected so as to remove this base drive signal when the predetermined energy level is sensed by the energy sensing means 94. This arrangement is illustrated in FIG. 4 wherein a base drive signal is applied over conductor 240 and through resistance 242 and diode rectifier 244 to the base electrode of transistor device 68 in oscillator circuit 62. This base drive over conductor 240 saturates transistor device 68 and prevents capacitance 66 of oscillator circuit 62 from being charged up so that no turn on signals can be produced thereby. A switch means, shown as transistor 248, is connected so that when such transistor device 248 is rendered conducting the base drive which was keeping transistor 68 saturated is removed and the oscillator circuit 62 is rendered operative to produce turn on signals for application to electric valve 42. To this end, the emitter electrode 250 of transistor 248 is connected to the common negative conductor 61 and the collector electrode 252 is connected to the junction 254 between resistance 242 and diode rectifier 244; the base electrode 256 being connected to the common positive conductor 59 through resistance 96, energy sensing device 94 and the series combination of diode rectifier 88 and inductance 86. Thus, until breakover device 94 breaks over, transistor device 248 is in the nonconducting state and transistor device 68, due to the base drive applied over conductor 240, is in its fully conducting state. Accordingly, the oscillator circuit 62 is inoperative.

As soon as the predetermined level of energy has been stored in energy storage means 78, however, breakover device 94 breaks over causing transistor device 248 to be turned on to remove the base drive from transistor 68 which was being applied thereto over conductor 240. With the base drive signal which has been holding transistor 68 saturated now removed, the capacitance 66 can be charged from the source through resistance 260 so that oscillator circuit 62 can produce electrical turn on signals which, as shown in FIG. 2, for example, are coupled to the control electrode 45 of the electric valve 42 to turn it on.

From the foregoing it will be evident that many different arrangements may be employed with the energy sensing means 94 to prevent the application of electrical turn on signals to the control electrode of the electric valve 42 unless the predetermined level of energy is sensed by the energy sensing means 94. Only some of which have been shown and described herein.

While only certain specific embodiments of our invention have been described, many changes and modifications will occur to those skilled in the art and may be made without departing from the invention. The appended claims, therefore are intended to cover all such changes and modifications as fall within the true spirit and scope of the invention.

What we claim and desire to secure by Letters Patent of the United States is:

1. A commutation system for turning off an electric valve, having anode, cathode and control electrodes, arranged when conducting to supply energizing current to an electrical load means from a direct current source, the combination comprising:
    (a) an electrical energy storage means;
    (b) means connected with said energy storage means for charging said energy storage means when said electric valve is nonconducting adapted to have electric turn on signals connected to it, means connected to said storage means for developing electric turn on signals;
    (c) energy sensing means connected with said energy storage means operative to prevent the application of said electrical turn on signals to the control electrode of said electric valve unless a predetermined amount of energy is stored in said energy storage means.

2. The commutation system recited in claim 1 wherein said means operative to utilize the energy of said energy storage means to reverse bias said first electric valve includes a second electric valve connected with said energy storage means and said first electric valve so that when said second electric valve is conductive said energy storage means is connected across the anode and cathode electrodes of said first electric valve.

3. The commutation system recited in claim 1 wherein said energy sensing means is a semiconductor breakover device.

4. The commutation system recited in claim 2 wherein said energy sensing means is a semiconductor breakover device and said first and second electric valves are controlled rectifier devices.

5. A commutation system for an electric valve having anode, cathode and control electrodes and arranged when conducting to supply energizing current to an electrical load means from a direct current source, the combination comprising:
    (a) an electrical energy storage means;
    (b) charging circuit means connected with said energy storage means for charging said energy storage means when said electric valve is nonconducting adapted to have electric turn on signals connected to it, means connected to said storage means for developing electric turn on signals;
    (c) energy sensing means connected with said energy storage means to sense the energy level thereof, said energy sensing means being operative to prevent the application of said electrical turn on signals to the control electrode of said electric valve unless a predetermined amount of energy has been stored in said energy storage means;
    (d) means operative upon initiation of conduction of said electric valve to lock the energy stored in said energy storage means in a series circuit loop including the anode and cathode electrodes of said electric valve and allow the charge on said energy storage means to be reversed.

6. The commutation system recited in claim 5 wherein said energy sensing means includes a semiconductor breakover device.

7. The commutation system recited in claim 5 wherein said energy sensing means is connected to keep the source of electrical turn on signals inoperative unless the predetermined amount of energy has been stored in said energy storage means.

8. The commutation system recited in claim 7 wherein said energy sensing means is a semiconductor breakover device.

9. The commutation system recited in claim 6 wherein said breakover device controls the operation of an oscillator circuit means which generates electrical turn on signals for coupling to the control electrode of said electric valve.

10. The commutation system recited in claim 6 wherein said breakover device controls the operation of a switch means connected to be actuated to the "on" condition whenever said breakover device is in the breakover state and allow electrical signals to be aplied to the control electrode of said electric valve.

11. The commutation system of claim 10 wherein said switch means is connected between a source of electrical turn on signals and the control electrode of said electric valve.

12. The commutation system of claim 10 wherein said switch means is connected when on to render a second switch means nonconducting which second switch means is connected in an electrical path shunting the electrical turn on signals away from said control electrode.

13. A commutation system for an electric valve, having anode, cathode and control electrodes and arranged when conducting to supply energizing current to an electrical load means from a direct current source, the combination comprising:
  (a) an electrical energy storage means connected with said electric valve;
  (b) charging means connected with said energy storage means for charging said energy storage means in a first sense when said electric valve is nonconducting adapted to have electric turn on signals connected to it, means connected to said storage means for developing electric turn on signals;
  (c) energy sensing means connected with said energy storage means for sensing the energy of said energy storage means;
  (d) means controlled by said energy sensing means for preventing the application of said electrical turn on signals to the control electrode of said electric valve unless the energy of said energy storage means exceeds a predetermined level;
  (e) transfer circuit means connected with said energy storage means and said electric valve operative once conduction has been initiated in said electric valve to lock said energy in said transfer circuit means and provide for transfer of said energy so that said energy storage means becomes charged in the opposite sense; and,
  (f) means including a second electric valve for connecting said oppositely charged energy storage means across the anode and cathode electrodes of said electric valve to provide a reverse bias therefor.

14. The commutation system recited in claim 13 wherein said energy sensing means is a semiconductor breakover device and said first and second electric valves are controlled rectifier devices.

15. The commutation system recited in claim 13 wherein said second electric valve is connected to charge said energy storage means from said direct current source.

16. The commutation system recited in claim 15 wherein said energy storage means is a capacitance and said transfer circuit means includes an inductance connected in series circuit relationship with said capacitance and the anode and cathode electrodes of the first electric valve.

17. The commutation system recited in claim 16 including means for detecting when the transfer of energy in said capacitance has been completed and causing said second electric valve to be rendered conductive so that said capacitance is connected across said first electric valve to provide reverse bias therefor.

18. The commutation system recited in claim 13 wherein the means for detecting when the energy transfer has been completed is a diode rectifier connected in series with said capacitance and inductance and poled to allow the charge on said capacitance to be reversed when said first electric valve is rendered conductive.

19. The commutation system recited in claim 18 wherein said second electric valve is a controlled rectifier having its anode electrode connected with the anode electrode of said first electric valve, its cathode connected with said capacitance and its control electrode connected at the junction between said diode rectifier and said inductance.

20. The commutation system recited in claim 19 wherein said energy sensing means is a semiconductor breakover device.

21. In an electrical circuit arrangement of the type wherein the anode and cathode electrodes of a first electric valve are adapted to be connected with a direct current source and an electrical load means to supply energizing current to said load means when said first electric valve is conducting and wherein conduction is initiated in said first electric valve by application of electrical turn signals to the control electrode thereof, the combination with such circuit arrangement of a commutation system comprising:
  (a) an electrical energy storage means connected with said first electric valve;
  (b) charging circuit means for charging said energy storage means when said first electric valve is nonconducting adapted to have electric turn on signals connected to it, means connected to said storage means for developing electric turn on signals;
  (c) energy reference means connected to sense the energy of said energy storage means;
  (d) means rendered operative when a predetermined energy level is sensed by said energy reference means to allow said electrical turn on signals to be applied to the control electrode of said first electric valve; and,
  (e) means for utilizing the energy of said energy storage means to reverse bias said first electric valve.

22. A chopper regulator circuit comprising:
  (a) first and second terminals connected to said circuit adapted to be connected with a source of direct current;
  (b) a third terminal adapted to be connected with an electrical load means;
  (c) a first controlled rectifier having anode, cathode and control electrodes;
  (d) means connecting the anode and cathode electrodes of said controlled rectifier between said first and third terminals;
  (e) means coupling electrical signals to said control electrode operative to initiate conduction in said controlled rectifier;
  (f) a second controlled rectifier having anode, cathode and control electrodes;
  (g) means connecting the anode electrode of said second controlled rectifier to said first terminal;
  (h) a capacitance connected between the cathode electrodes of said first and second controlled rectifiers;
  (i) a rectifier device having its anode connected with the cathode of said second controlled rectifier and its cathode connected with the control electrode thereof;
  (j) an inductance connected between said first terminal and said control electrode of said second controlled rectifier, said capacitance, rectifier device and inductance forming a series loop with the anode and cathode electrodes of said first controlled rectifier so that once said first controlled rectifier has been rendered conductive energy stored in said capacitance is locked within said series loop;
  (k) a semiconductor breakover device connected to sense the energy stored in said capacitance and being operative to prevent the application of electrical signals to the control electrode of said first controlled rectifier unless a predetermined amount of energy has been stored in said capacitance;
  (l) first and second circuit means for developing control feed-back signals indicative respectively of the deviation in load voltage and current from predetermined valves; and,
  (m) means for employing said feed-back signals to control the application of electrical signals to the control electrode of said first controlled rectifier.

23. The chopper regulator circuit recited in claim 22 wherein the electrical signals coupled to the control electrode of said first controlled rectifier are generated by an oscillator circuit which is rendered operative only when said semiconductor breakover device is in the broken over state.

24. The chopper regulator circuit recited in claim 22 wherein said breakover device operates when broken over to unblock the path for the electrical signals to the control electrode of said first controlled rectifier.

25. The chopper regulator circuit recited in claim 23 wherein said oscillator circuit includes a capacitance and said breakover device is connected in the charging path thereof.

26. The chopper regulator circuit recited in claim 22 wherein said breakover device controls the operation of a switch means in the path coupling the electrical signals to the control electrode of said first controlled rectifier.

27. The chopper regulator circuit recited in claim 26 wherein said switch means is a transistor device which is switched on when said breakover device is in its broken over condition.

28. In an electric circuit arrangement of the type wherein the anode and cathode electrodes of a first electric valve are connected in series circuit relationship with a direct current source and a load means, an energy storage means, a second electric valve, said energy storage means being charged in a first sense through a said second electric valve when said first electric valve is nonconducting, the charge on said energy storage means is reversed when said first electric valve is conducting and said second electric valve rendered conducting to allow the energy of said energy storage means to be utilized to reverse bias the first electric valve, the combination with such a circuit arrangement of an energy sensing means connected to sense the energy level of said energy storage means and to prevent the application of electrical turn on signals to the control electrode of the first electric valve unless said energy storage means has a predetermined level of energy.

29. The circuit arrangement recited in claim 28 wherein said energy sensing means is a semiconductor breakover device of the Zener-type.

30. The circuit arrangement recited in claim 28 wherein said second electric valve has an anode, a cathode and a control electrode and said anode electrode is connected with the anode electrode of said first electric valve, said cathode electrode is connected with one terminal of said energy storage means the other terminal of which is connected with the cathode electrode of said first electric valve; and means for detecting when the charge on said energy storage means has been reversed and applying an electrical turn on signal to the control electrode of said second electric valve when said charge is reversed to render said second electric valve conducting and connecting said energy storage means across the anode and cathode electrodes of said first electric valve to effect turn off thereof.

31. The circuit arrangement recited in claim 29 wherein said energy sensing means is a semiconductor device of the Zener-type.

32. The circuit arrangement recited in claim 28 wherein said second electric valve is a semiconductor unilateral switch means of the Shockley-type.

33. The circuit arrangement recited in claim 28 wherein said first and second electric valves are controlled rectifiers.

34. The method of turning off an electric valve which when conducting supplies energizing current to a load means comprising:
  (a) charging an energy storage means when said electric valve is nonconducting;
  (b) sensing the energy of said energy storage means;
  (c) allowing said electric valve to be turned on only when there is at least a predetermined amount of energy in said energy storage means; and,
  (d) utilizing the energy of said energy storage means to reverse bias said electric valve.

35. The method of turning off a first electric valve of the type having anode, cathode and control electrodes and arranged when rendered conductive by application to the control electrode of suitable electrical signals to supply energizing current to an electrical load means comprising the steps of:
  (a) charging an energy storage means in a first sense when said first electric valve is nonconducting;
  (b) sensing the energy of said first sense in said energy storage means;
  (c) preventing said first electric valve from being rendered conductive unless there is a predetermined energy level in said energy storage means;
  (d) reversing the charge on said energy storage means when said first electric valve is conducting; and,
  (e) connecting the energy storage means after the charge thereof has been reversed across said first electric valve so that the energy of said energy storage means is operative to reverse bias said first electric valve and effect the turn off thereof.

References Cited
UNITED STATES PATENTS

| | | | |
|---|---|---|---|
| 3,119,058 | 1/1964 | Genuit | 321—45 |
| 3,207,974 | 9/1965 | McMurray | 321—45 |
| 3,354,370 | 11/1967 | Corry et al. | 321—45C |
| 3,360,712 | 12/1967 | Morgan | 321—43 |
| 3,372,327 | 3/1968 | Morgan | 321—43 |
| 3,384,804 | 5/1968 | Salihi | 321—45C |
| 3,453,524 | 7/1969 | Dinger | 321—45X |

OTHER REFERENCES

IBM Technical Disclosure Bulletin, vol. 6, No. 8, January 1964, pp. 31–32.

WILLIAM M. SHOOP, Jr., Primary Examiner